Jan. 26, 1971 A. JENSEN ET AL 3,559,033
GENERATOR FOR SUPPLYING CONTROL SIGNALS FOR STRIKING
THE CONTROLLABLE RECTIFIERS OF AN INVERTED CONVERTER
Filed Jan. 21, 1969 2 Sheets-Sheet 1
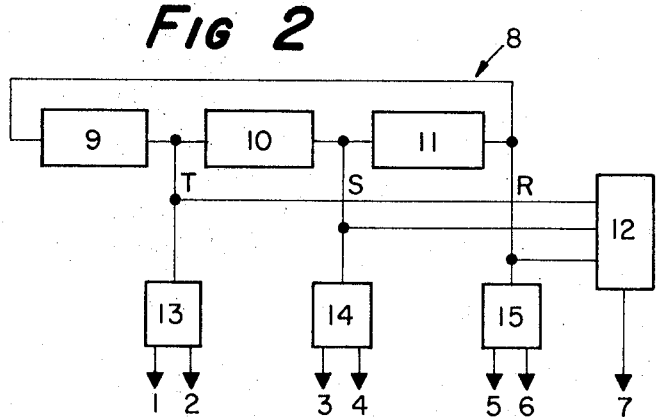
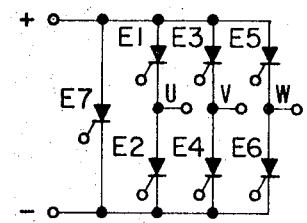
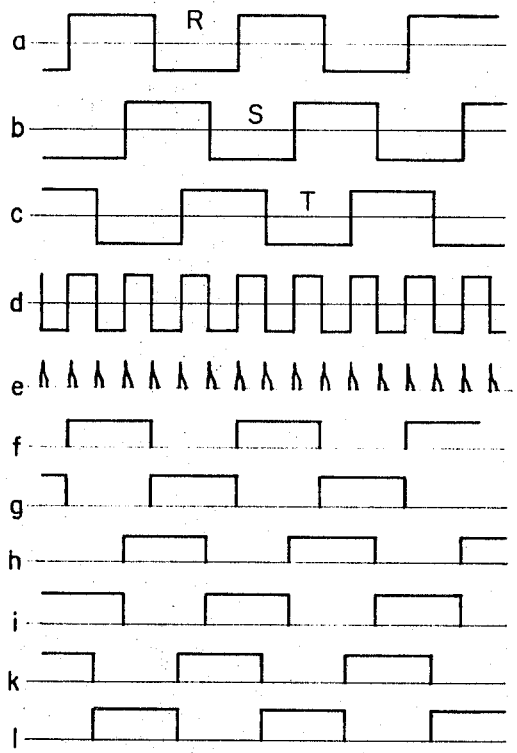
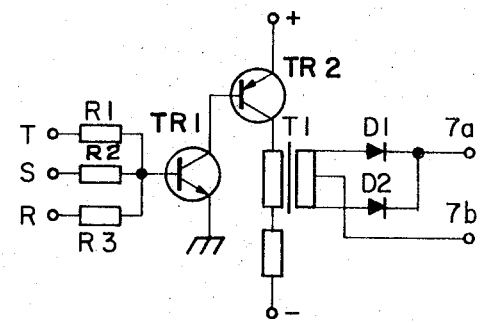
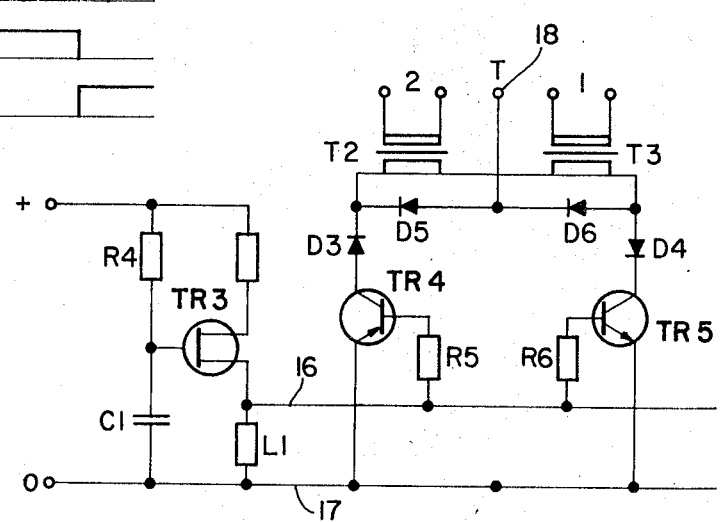

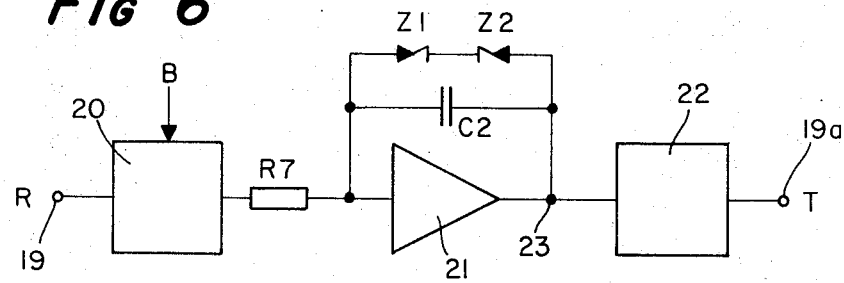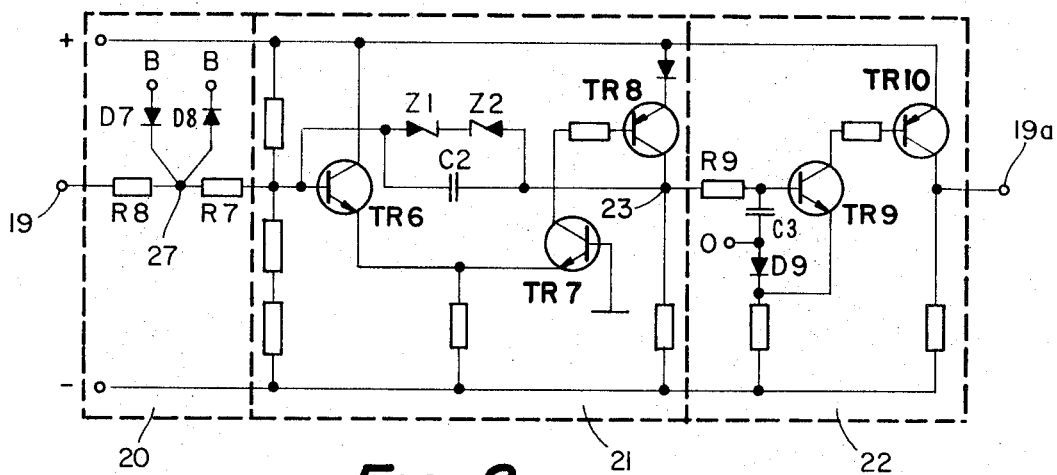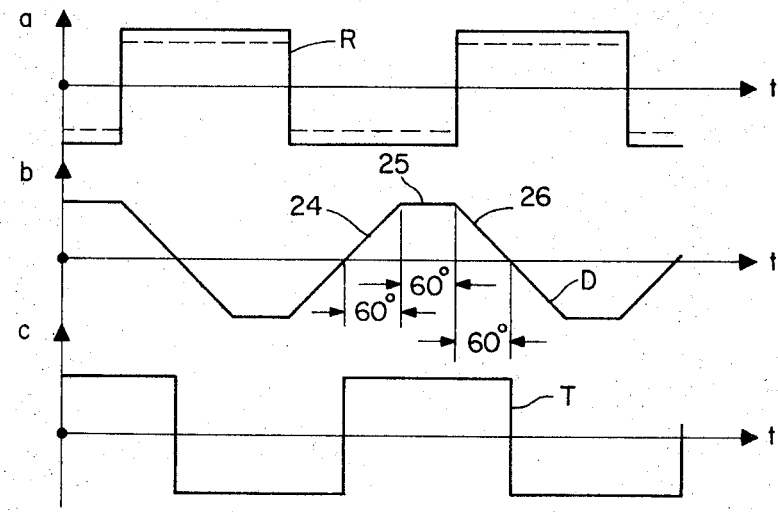

United States Patent Office 3,559,033
Patented Jan. 26, 1971

3,559,033
GENERATOR FOR SUPPLYING CONTROL SIGNALS FOR STRIKING THE CONTROLLABLE RECTIFIERS OF AN INVERTED CONVERTER
Arne Jensen and Tom Kastrup Petersen, Nordborg, Denmark, assignors to Danfoss A/S, Nordborg, Denmark, a company of Denmark
Filed Jan. 21, 1969, Ser. No. 792,259
Claims priority, application Germany, Jan. 2, 1968,
P 16 13 770.5
Int. Cl. H02m 7/52
U.S. Cl. 321—5                                                      9 Claims

ABSTRACT OF THE DISCLOSURE

The invention relates to a generator for supplying control signals for a three phase inverted converter of the type having three pairs of jointly quenchable, controllable rectifiers. Three substantially square wave signals are generated at a predetermined frequency and displaced from each other by 120 degrees. Striking means receive the signals and separate the upper and lower halves of each square signal and sequentially directs the half waves to the converter rectifiers. Quenching means also receive the signals and sums them to form a summated signal, the summated signal being directed to the converter for jointly quenching the rectifiers.

---

The invention relates to a generator for supplying control signals for striking the jointly-quenched, controllable rectifiers of a three-phase inverted converter.

In the case of inverted converters wherein all the rectifiers are jointly quenched, there is considerable saving in components, since it is not necessary for a quenching control arrangement to be associated with each individual rectifier. On the other hand, provision must be made for each quenched rectifier that has to remain conducting according to the phase programme, to be immediately struck again thereafter. For example, the striking signals, which are normally of low frequency and are formed by a series of impulses of high frequency, can be present during the entire required striking period.

A generator is known wherein impulses of six times the frequency of the frequency required at the inverted converter are produced and the quenching impulses are derived directly therefrom. At the same time these impulses are supplied, as timing impulses, to a six-stage annular counter, the six output points of which are each connected to a gate circuit controlling the high-frequency striking impulses. Provision is made for each two successive stages to be conducting. This pattern is shifted in the annular counter with the frequency six times as great as the frequency desired at the inverted converter.

Particularly because of the six-stage annular counter, this known arrangement calls for considerable expense in the switching means. Moreover, the striking signals cover only 120° in each case.

The object of the invention is to provide a generator of the originally described kind with the help of which it is possible to produce, in a much simpler manner, striking signals extending over 180° and quenching signals.

According to the invention this object is achieved by using the three substantially square output signals of a three-phase generator operated at the frequency desired for the inverted converter, for striking each one rectifier on a half-wave basis on the one hand and adding them on the other, the flanks of the summated signal being employed for quenching all the rectifiers.

In contrast to the known generator, the starting frequency is here equal to the frequency required at the inverted converter. The multiplication of the frequency for the quenching impulses takes place by simple addition. Each half-wave of the three-phase generator has an inherent duration of 180°.

The output points of the three-phase generator are preferably each connected by way of a resistor to the input of an amplifier the output of which has an impulse transformer, from the secondary side of which the quenching impulses are taken via a two-way rectifier control arrangement. The output signals are summated in the amplifier. The two-way rectifier enables each flank of the summated signal to be used for producing a quenching impulse.

In a further form of the invention, symmetrical signals can be supplied from each output point of the three-phase generator to each one striking impulse emitter having two branches which each incorporate an impulse transformer, a diode and a transistor, prepared for opening by high frequency impulses, the transistors and the diodes in the two branches having different pass-through directions. In particular, the impulse transformers can be bridged by a diode which allows the unrequired half-wave to pass by. Each branch of the striking impulse emitter responds during one half-wave of the three-phase generator output signal.

It is particularly advantageous if the three-phase generator comprises three similar loop-connected units, which integrate the square-wave output signals of the preceding unit, trim the integrated signal on both sides to give a constant amplitude and, depending upon the sign of the trapevoidal signal so obtained, produce a square wave of constant, but preferably controlled amplitude, as the output signal. Surprisingly, a loop of this kind consisting of three similar units, results in a three-phase generator having an output square-wave signal shifted through 120° each time. By altering the amplitude of the square-wave signal, the frequency can be altered, while the form of the curve and the phase relationship are maintained.

In particular, the amplitudes of the square waves at the output of all three units can be jointly controlled proportionally to the voltage occurring at the inverted converter. In this way, a form of control is achieved wherein a motor powered by the inverted converter maintains a constant magnetization independently of its speed, so that the motor has a speed-dependent torque at a given load.

The invention will now be described in more detail by reference to embodiments illustrated in the drawing, wherein:

FIG. 1 is a schematic connexion diagram for the inverted converter to be controlled, FIG. 2 is a block connexion diagram for a generator in accordance with the invention, FIG. 3 is a switching arrangement for producing the quenching impulses, FIG. 4 is a switching arrangement for producing the striking impulses, FIG. 5 shows, in the time diagrams *a–l*, signals at the various points in the generator, FIG. 6 is a schematic connexion diagram for a unit of a three-phase generator usable in accordance with the invention, FIG. 7 is a connexion diagram for the unit of FIG. 6, and FIG. 8 shows, in three time diagrams *a–c*, the path of the signal at various points in the three-phase generator.

Referring to FIG. 1, the inverted converter incorporates six controllable rectifiers E1–E6, which are connected in series in pairs and between which they branch off three phase leads U, V and W for feeding a three-phase consumer unit. Also provided is a quenching rectifier E7, which is briefly struck and immediately afterwards is quenched again (by means of a quenching circuit, not illustrated). Since the voltage at the input of the inverted converter thereby breaks down, all of the rectifiers E1–E6, struck at the time, are quenched. For controlling the rectifiers of the inverted converter shown in FIG. 1, use is made of the control generator illustrated in FIG. 2, the outputs 1–7 of which are each associated with the related rectifier E1–E7. The control generator comprises a three-phase generator 8, which consists of three similar units 9, 10 and 11, which are loop-connected. At the outputs R, S and T, square waves are picked up which are displaced from each other by 120° as shown in the diagrams a–c in FIG. 5.

These output signals are, on the one hand, added in the summation circuit 12, this resulting in the signal of FIG. 5d, which has a frequency three times as great as the basic frequency. By differentiation and rectification the impulse sequence of FIG. 5e is obtained, so that quenching impulses having a frequency six times as great as the basic frequency occur at the output 7.

Furthermore, the square-wave output signals of the individual units are passed to the striking impulse circuits 13, 14 and 15. In each of these, one half-wave of the square-wave signal is used for one output and the other half-wave for the second output, so that high-frequency impulses are sent to the associated controllable rectifiers E1–E6 from the outputs 1–6 during the periods shown in FIGS. 5f–l. Consequently, this ensures that a rectifier is struck again immediately after the joint quenching, if its striking cycle is not ended.

FIG. 3 shows an example of the summation circuit 12. The output signals T, S and R are passed by way of three summating resistors R1, R2 and R3, to the base of a transistor Tr1, in the collector circuit of which is connected a second transistor Tr2. In the collector circuit of this is included the primary winding of a transformer T1, the secondary winding of which runs, through a two-way rectifier D1, D2, to one output terminal 7a and the middle tapping of which runs directly to the second output terminal 7b of the output point 7. In the primary winding of the transformer T1, the current flows as shown in FIG. 5d. This current is differentiated by the transformer and is rectified by the rectifiers D1, D2, so that the sequence of impulses seen in FIG. 5e is available at the output point 7.

FIG. 4 illustrates an example of a striking impulse switch. Let it be assumed that the circuit in question is the striking impulse circuit 13. High-frequency signals of 10–100 kilocycles are passed by way of leads 16 and 17 from a relaxation generator, which comprises a unijunction transistor Tr3, with which is associated the charging condenser C1. This can be charged by way of a resistor R4. As soon as the condenser C1 has reached the threshold voltage, it discharges through a choke L1. The high-frequency oscillations occurring in the leads 16 and 17 are passed to all three circuits 13, 14 and 15.

In each circuit, the lead 16 is connected, through series resistors R5 and R6, with the bases of two complementarily connected transistors Tr4 and Tr5. In the collector circuit of the transistor Tr4 are a diode D3 and the primary winding of an impulse transformer T2. The collector circuit of the transistor Tr5 contains a diode D4 of opposite polarity and the primary winding of an impulse transformer T3. Both impulse transformers are each bridged by a diode D5 and D6. The voltage and energy for the two transistors is supplied from the units 9, 10 and 11 by way of the input terminals 18, in the form of the square-wave signals R, S and T. The secondary windings of the two transformers T2 and T3 form the outputs 1 and 2 for the quenching impulses.

When a positive voltage is present at the terminal 18, a current can flow only through the diode D4 and the transistor Tr5, so that quenching impulses are sent from the output 1 during the entire half-wave of the square-wave voltage T. If the voltage at the input 18 is negative, current can flow only through the diode D3 and the transistor Tr4, so that striking impulses are supplied at the output 2. The diodes D5 and D6 provide for only impulses of one polarity occurring at the outputs 1 and 2.

A basic connexion diagram for a unit of the three-phase generator 8 is illustrated in FIG. 6. It is assumed that the unit in question is unit 9. The square-wave signal R is fed to the input 19. The square-wave signal T is picked up from the output 19a. Connected to the input 19 is a limiter arrangement 20 which limits the amplitude of the square-wave R by means of a voltage signal B. The limited signal is passed by way of a resistor R7 to an amplifier stage 21, which is connected as an integrator with the help of the condenser C2. Also, it is bridged by two Zener diodes Z1 and Z2. Connected on the outlet side of this stage is a zero detector 22, which, in dependence upon the sign of the signal at the amplifier output 23, produces a square-wave signal of like polarity.

FIG. 8a shows the input signal R, which can be limited in the limiter arrangement to the amplitude shown in broken lines. At the amplifier output 23 there occurs a trapezoidal curve D, wherein each half-wave is composed of an ascending branch 24 of the trapezium, a constant portion 25 and a descending branch 26 of the trapezium, the half-wave in each case extending over 60°. This form of curve occurs as a result of the construction of the individual units and their loop connexion. The integration amplifier integrates the square-wave R. This results in the branch 26 of the trapezium of one half-wave and the branch 24 of the trapezium of the following half-wave. Integration is interrupted when the limiting value, governed by the two Zener diodes Z1 and Z2, is reached, and the portion 25 is thereby determined. It will be seen that the slope of the trapezium and thus the frequency of the trapezoidal wave varies when the amplitude of the square wave R is varied. Finally, as indicated in FIG. 8c, the polarity of the trapezoidal wave is fixed in the zero detector 22 and, in dependence hereon, a signal is supplied corresponding to the phase T.

In the arrangement in accordance with FIG. 7, the input 19 is connected, through a resistor R8, to a point 27, which, via two rectifiers D7 and D8, connected in anti-parallel, is linked to two connection points, by way of which the positive limiting voltage +B and the equally great negative limiting voltage —B are passed. The integration amplifier is designed as a sum-and-difference amplifier, the input branch of which consists of a transistor Tr6 and the output branch of which is made up of two complementary transistors Tr7 and Tr8. The base of the transistor Tr6 is connected to the resistor R7. The base of the transistor Tr7 is connected to earth. The output collector is connected to the base of the input transistor Tr6 through the integration condenser C2 and is bridged by the two Zener diodes Z1 and Z2 connected in series in opposition.

The zero connector consists of a D.C.-coupled two-stage transistor amplifier incorporating the two transistors Tr9 and Tr10. The base of the transistor Tr9 is connected to the output point 23 of the integration amplifier by way of a resistor R9. The base-emitter gap of the input transistor Tr9 is connected to a reference point 0, e.g. the middle point of the current supply for the generator. This reference point branches off between a condenser C3 and a rectifier D9 in the base-emitter circuit.

We claim:

1. A generator for supplying control signals for a three phase inverted converter of the type having three pairs of jointly quenchable, controllable rectifiers, comprising, means for generating three substantially square wave signals at a predetermined frequency and displaced from each other by 120 degrees, separate output points for said signals, striking means connected to said output points for receiving said signals and separating the upper and lower halves of each of said square signals and sequentially directing said halves to said rectifiers, and quenching means connected to said output points for receiving and summing said signals to form a summated signal, said summated signal being directed to said converter for jointly quenching said rectifiers.

2. A generator according to claim 1 wherein said quenching means includes an amplifier, resistors connected between said output points and the input of said amplifier, an impulse transformer connected to the output of said amplifier, and two way rectifier control means connected to the secondary side of said transformer for providing full wave rectification of quenching impulses from the secondary side of said transformer.

3. A generator according to claim 1 wherein said striking means comprise three impulse emitter assemblies, each of said assemblies having two branches with an impulse transformer, diode and transistor in each of said branches, said branches being arranged for different pass through directions, and the high frequency impulse means for opening said transistors.

4. A generator according to claim 3 wherein each of said transformers is bridged by a diode.

5. A generator according to claim 1 including three loop connected units, each of said units having means for producing a square wave of constant amplitude by (1) integrating the square wave signal of the adjacent preceeding one of said units to form an integrated wave, and (2) trimming said integrated wave on both sides to a constant amplitude.

6. A generator according to claim 5 wherein each of said units includes an amplifier stage connected as an integrator and a zero detector connected in series with said amplifier stage, said amplifier stage having the integration condenser thereof bridged by double ended limiter means, said zero detector being of high amplification and having an output signal of the same phase as its input signal.

7. A generator according to claim 6 wherein said limiter means is between the input and output of said amplifier stage, said limiter means being adjustable by a D.C. voltage to limit the amplitude of the square wave.

8. A generator according to claim 5 including means for jointly controlling the amplitudes of the square waves of the outputs of said three units proportionally to the voltage occurring at said inverted converter.

9. A generator according to claim 6 including at least one of said units, two series connected resistors between the input of said one unit and the input base of said amplifier of said one unit, said one unit having two oppositely connected and biased diodes connected to a point between said two resistors, said amplifier stage including sum-and-difference amplifying means having an input which includes a transistor and an output which includes a transistor and an output which includes two complementary transistors, the output collector of said complementary transistors being connected to said transistor in said input via said integration condenser, said limiter means comprising two Zener diodes oppositely connected in parallel to said integration condenser, said zero detector comprising a D.C. coupled two stage transistor amplifier, said output of said one unit being connected to the collector of said two stage transistor amplifier.

References Cited
UNITED STATES PATENTS

| | | | |
|---|---|---|---|
| 3,321,697 | 5/1967 | Etter | 321—45 |
| 3,388,310 | 6/1968 | Etter | 321—5 |
| 3,406,325 | 10/1968 | Rosa | 321—5 |

WILLIAM M. SHOOP, JR., Primary Examiner

U.S. Cl. X.R.

321—45